(12) United States Patent
Namba et al.

(10) Patent No.: US 7,479,743 B2
(45) Date of Patent: Jan. 20, 2009

(54) VEHICLE LIGHTING APPARATUS

(75) Inventors: Takanori Namba, Shizuoka (JP);
Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 38 days.

(21) Appl. No.: 11/636,915

(22) Filed: Dec. 11, 2006

(65) Prior Publication Data

US 2007/0132407 A1 Jun. 14, 2007

(30) Foreign Application Priority Data

Dec. 12, 2005 (JP) .............................. 2005-357491

(51) Int. Cl.
*H05B 37/02* (2006.01)
*H05B 39/04* (2006.01)
*H05B 41/36* (2006.01)
*H05B 37/00* (2006.01)
*H05B 41/16* (2006.01)
*G05F 1/00* (2006.01)

(52) U.S. Cl. ...................... 315/307; 315/291; 315/224; 315/209 R; 315/312; 315/247

(58) Field of Classification Search ......... 315/312–325, 315/185 S, 200 A, 291, 297, 307–311, 224, 315/225
See application file for complete search history.

(56) References Cited

U.S. PATENT DOCUMENTS

| | | | | |
|---|---|---|---|---|
| 4,017,796 | A | * | 4/1977 | Tobias ........................ 324/122 |
| 5,119,224 | A | * | 6/1992 | Smith ......................... 398/138 |
| 7,009,854 | B2 | * | 3/2006 | Fushimi ................... 363/21.09 |
| 7,105,945 | B2 | * | 9/2006 | Shiotsu et al. ............. 307/10.8 |
| 7,244,036 | B2 | * | 7/2007 | Murakami et al. ............ 362/20 |
| 2006/0082332 | A1 | * | 4/2006 | Ito et al. ..................... 315/291 |

* cited by examiner

*Primary Examiner*—Douglas W. Owens
*Assistant Examiner*—Jianzi Chen
(74) *Attorney, Agent, or Firm*—Osha • Liang LLP

(57) ABSTRACT

A vehicle lighting apparatus includes a plurality of semiconductor light sources that are connected with each other in series, a switching regulator for supplying an electric power from a power source to each of said plurality of semiconductor light sources, forward voltage detection circuitry for detecting a forward voltage of each of said plurality of semiconductor light sources, and failure detection circuitry for detecting the failure of each of said semiconductor light sources based on the detected value of said forward voltage detection means. A semiconductor light source having a lower forward voltage is connected closer to a reference potential side of said power source among said plurality of semiconductor light sources.

6 Claims, 8 Drawing Sheets

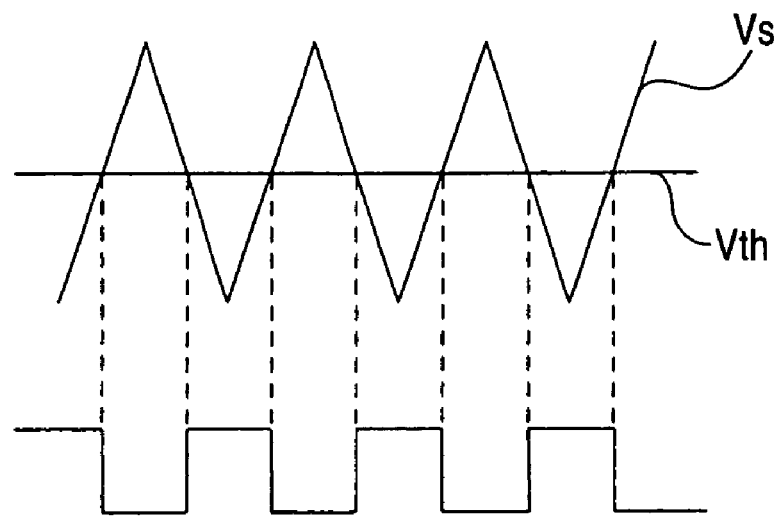
FIG. 4 (a)
FIG. 4 (b)
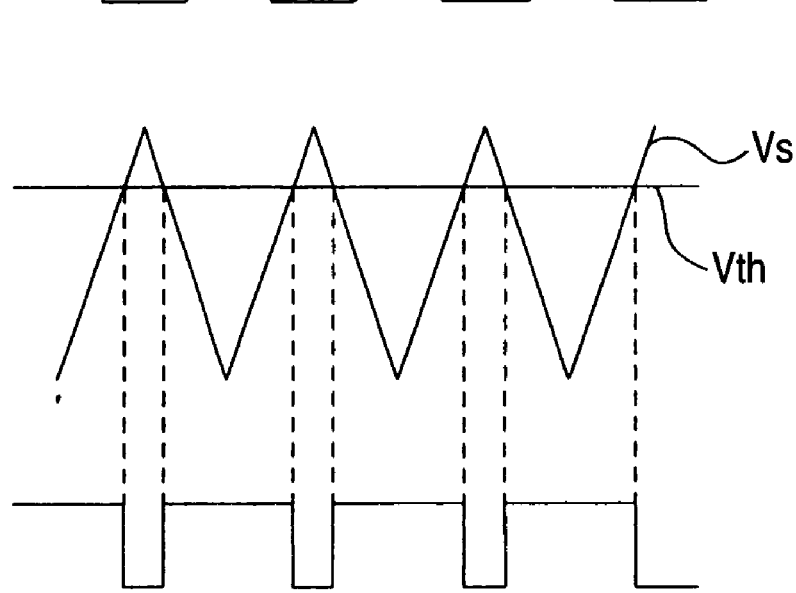
FIG. 4 (c)
FIG. 4 (d)
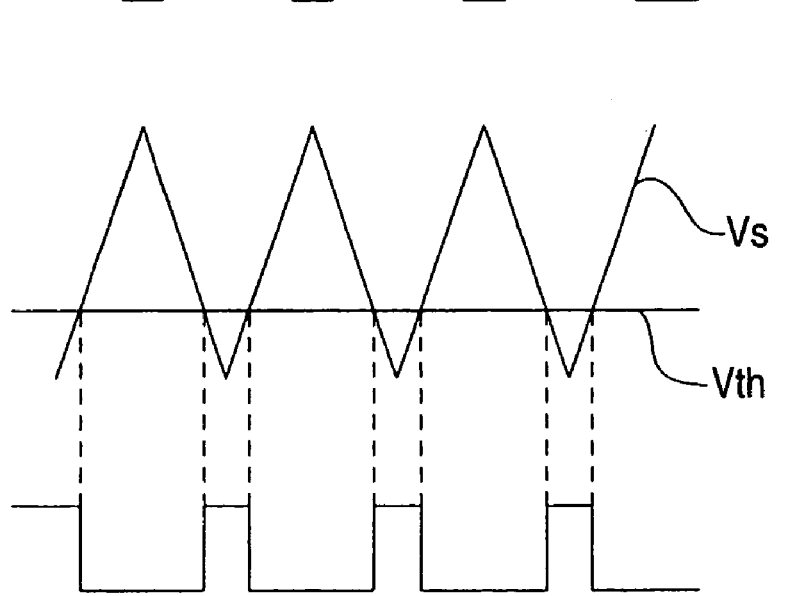
FIG. 4 (e)
FIG. 4 (f)

VEHICLE LIGHTING APPARATUS

This application claims foreign priority from Japanese Patent Application No. 2005-357491, filed Dec. 12, 2005, the entire contents of which are hereby incorporated by reference.

BACKGROUND OF THE INVENTION

1. Field of the Invention

The present invention relates to a vehicle lighting apparatus, and more particularly to a vehicle lighting apparatus that controls the lighting of a semiconductor light source composed of semiconductor light emitting elements.

2. Related Art

Conventionally, vehicle lighting fixtures using a semiconductor light emitting element, such as an LED (Light Emitting Diode), as a light source is well known. Vehicle lighting fixtures of this type have a lighting control circuit for controlling the lighting of the LED.

A lighting control circuit using a switching regulator capable of controlling the output voltage to the LED based on the current of the LED is well known. The switching regulator can control the output voltage to flow a specified current through each LED, even if a plurality of LEDs are connected in series or parallel as the load.

However, if the output of the switching regulator is short circuited, or has a ground fault, the switching regulator has a heavier load, and may fail with the excessive power load. Also, if the output of the switching regulator is opened due to a disconnection in the LED, the output voltage may be increased excessively, for example, in a switching regulator of a flyback type.

Thus, a switching regulator has been proposed in which, when a failure of the switching regulator on the output side is detected, the output voltage of the switching regulator is lowered (refer to patent document 1).

[Patent document 1] JP-A-2004-134147 (pages 3 to 8, Figs. 1, 6 and 7).

In the above prior art, a plurality of LED blocks are connected in parallel on the output side of the switching regulator, a series regulator comprising a switch element, a shunt resistor and a comparator being connected in series to each LED block, and the output voltage of the switching regulator is controlled so that the current of each LED block may become a specified value, in which the output voltage of the switching regulator is lowered when the failure occurs, whereby the operating LEDs can be protected even if some LEDs fail. However, it is not fully considered to precisely detect the failure in the individual LEDs making up the LED block.

For example, when the forward voltage Vf of each LED is detected to make the failure detection of each LED in three LED blocks connected in series due to a drop in the forward voltage Vf of each LED, it is necessary to consider the variations in the forward voltage Vf of the LED, because the forward voltage Vf of the LED has variations due to the "individual difference of LED", the "temperature characteristic of Vf" and the "V-I characteristic". Further, in detecting the forward voltage of each LED, when the voltage across each LED is divided and each partial voltage obtained by dividing the voltage is amplified by a differential amplification circuit, for example, assuming that the forward voltage Vf of three LEDs is about 10V, a voltage of 30V is applied across the three LEDs on the basis of the reference potential (ground=0V), in which the voltages of 30V and 20V are applied across the LED on the high potential side, the voltages of 20V and 10V are applied across the LED in the middle, and the voltages of 10V and 0V are applied across the LED on the reference potential side.

That is, 10V in 30V is detected and amplified by the differential amplification circuit to detect the forward voltage Vf of the LED on the high potential side, whereas 10V in 10V is detected and amplified by the differential amplification circuit to detect the forward voltage Vf of the LED on the reference potential side.

SUMMARY OF THE INVENTION

Though the variation (error) factors of each differential amplification circuit include the absolute precision and temperature characteristic of resistor, the offset voltage and temperature characteristic of operational amplifier, and the input bias current and temperature characteristic of operational amplifier, an error in detecting the forward voltage Vf of each LED occurs most significantly in detecting the forward voltage Vf on the high potential side. That is, assuming that the forward voltage Vf of three LEDs is all equal to 10V, the partial voltage is at higher level where 10V in 30V is detected than where 10V in 10V is detected, whereby the error of absolute value has greater influence on the error of differential value in the differential amplification circuit.

Particularly, if the LED on the high potential side has a forward voltage Vf of 5V, and the other LEDs have a forward voltage Vf of 10V among the three LEDs, 5V in 25V is detected for the LED on the high potential side, whereby the detection precision is further worse. This occurs whether the output of the switching regulator is positive (positive voltage with respect to the reference potential=ground 0V) or negative (negative voltage with respect to the reference potential=ground 0V).

One or more embodiments of the present invention detect a failure in the plurality of semiconductor light sources connected with each other in series at high precision.

One or more embodiments of the present invention relate to a vehicle lighting apparatus comprising a plurality of semiconductor light sources that are connected with each other in series, a switching regulator for supplying an electric power from a power source to each of the plurality of semiconductor light sources, forward voltage detection means for detecting a forward voltage of each of the plurality of semiconductor light sources, and failure detection means for detecting the failure of each of the semiconductor light sources based on the detected value of the forward voltage detection means, characterized in that the semiconductor light source having a lower forward voltage is connected closer to the reference potential side of the power source among the plurality of semiconductor light sources.

If the semiconductor light source having a lower forward voltage is connected closer to the reference potential side of the power source among the plurality of semiconductor light sources connected with each other in series, a voltage closer to the reference potential than the voltage applied to the other semiconductor light source is applied to the semiconductor light source having the lower forward voltage on the basis of the reference potential, whereby the forward voltage Vf of the semiconductor light source having the lower forward voltage is detected based on the voltage closer to the reference potential than the other semiconductor light source. As a result, the forward voltage Vf can be detected at higher precision than when the semiconductor light source having the lower forward voltage is arranged at the position farther away from the reference potential than the other semiconductor light source, whereby the failure of each semiconductor light source can be detected at high precision.

In accordance with one or more embodiments of the present invention, the forward voltage detection means comprises a plurality of inverted amplification means for inversely amplifying the terminal voltage of each of the semiconductor light sources on the basis of the reference potential of the power source, and outputting the voltage corresponding to the forward voltage of each of the semiconductor light sources, the plurality of inverted amplification means comprising reference potential side inverted amplification means for inversely amplifying the terminal voltage of the reference potential side semiconductor light source arranged at a position closest to the reference potential, and one or more inverted amplification means for difference amplification for inputting the output voltage of the reference potential side inverted amplification means at least as the voltage to be operated, and inversely amplifying a difference between the voltage to be operated and the terminal voltage of the semiconductor light source different from the reference potential side semiconductor light source, in which the one or more inverted amplification means for difference amplification input, as the terminal voltage to be inversely amplified, the output voltage of the other inverted amplification means for difference amplification into which terminal voltage having a smaller difference from the reference potential than the terminal voltage to be inversely amplified by itself is inputted as the voltage to be operated.

In employing, as the forward voltage detection means, the plurality of inverted amplification means for inversely amplifying the terminal voltage of each of the semiconductor light sources on the basis of the reference potential of the power source and outputting the voltage corresponding to the forward voltage of each of the semiconductor light sources, when the forward voltages of two semiconductor light sources are detected, two inverted amplification means can be configured by using the reference potential side inverted amplification means and one inverted amplification means for difference amplification, and when the forward voltages of three or more semiconductor light sources are detected, three or more inverted amplification means can be configured by using the reference potential side inverted amplification means and two or more inverted amplification means for difference amplification. In the latter case, each inverted amplification means for difference amplification inputs, as the terminal voltage to be inversely amplified, the output voltage of the other inverted amplification means for difference amplification into which terminal voltage having a smaller difference from the reference potential than the terminal voltage to be inversely amplified by itself is inputted as the voltage to be operated, and thereby can output inversely the voltage corresponding to the forward voltage of each semiconductor light source.

That is, in inversely amplifying the terminal voltage of each semiconductor light source, and outputting the voltage corresponding to the forward voltage of each semiconductor light source, if only the inverted amplification means is employed, it is required to increase the number of inverted amplification means for inversely amplifying the terminal voltage of each semiconductor light source, as the number of semiconductor light sources arranged farther away from the reference potential is increased. On the contrary, by using the reference potential side inverted amplification means and one or more inverted amplification means for difference amplification, the number of inverted amplification means can be reduced, even if the number of semiconductor light sources arranged farther away from the reference potential is increased, whereby the circuit configuration can be simplified.

In accordance with one or more embodiments of the present invention, the semiconductor light source having a smaller number of chips is connected closer to the reference potential side of the power source among the plurality of semiconductor light sources.

If the semiconductor light source having a smaller number of chips is connected closer to the reference potential side of the power source among the plurality of semiconductor light sources connected with each other in series, the voltage closer to the reference potential than the voltage applied to the other semiconductor light source is applied to the semiconductor light source having the smaller number of chips on the basis of the reference potential, whereby the forward voltage Vf of the semiconductor light source having the smaller number of chips is detected based on the voltage closer to the reference potential than the other semiconductor light source. As a result, the forward voltage Vf can be detected at higher precision than when the semiconductor light source having the smaller number of chips is arranged at the position farther away from the reference potential than the other semiconductor light source, whereby the failure of each semiconductor light source can be detected at high precision.

As will be apparent from the above explanation, In accordance with one or more embodiments of the present invention, the failure of each semiconductor light source can be detected at high precision.

In accordance with one or more embodiments of the present invention, the circuit configuration can be simplified.

In accordance with one or more embodiments of the present invention, the failure of the semiconductor light source having the smaller number of chips can be detected at high precision.

Other aspects and advantages of the invention will be apparent from the following description and the appended claims.

BRIEF DESCRIPTION OF THE DRAWINGS

FIGS. 4(a) to 4(f) are waveform charts for explaining the operation of the control circuit.

DETAILED DESCRIPTION OF THE EXEMPLARY EMBODIMENTS

Figure 1:
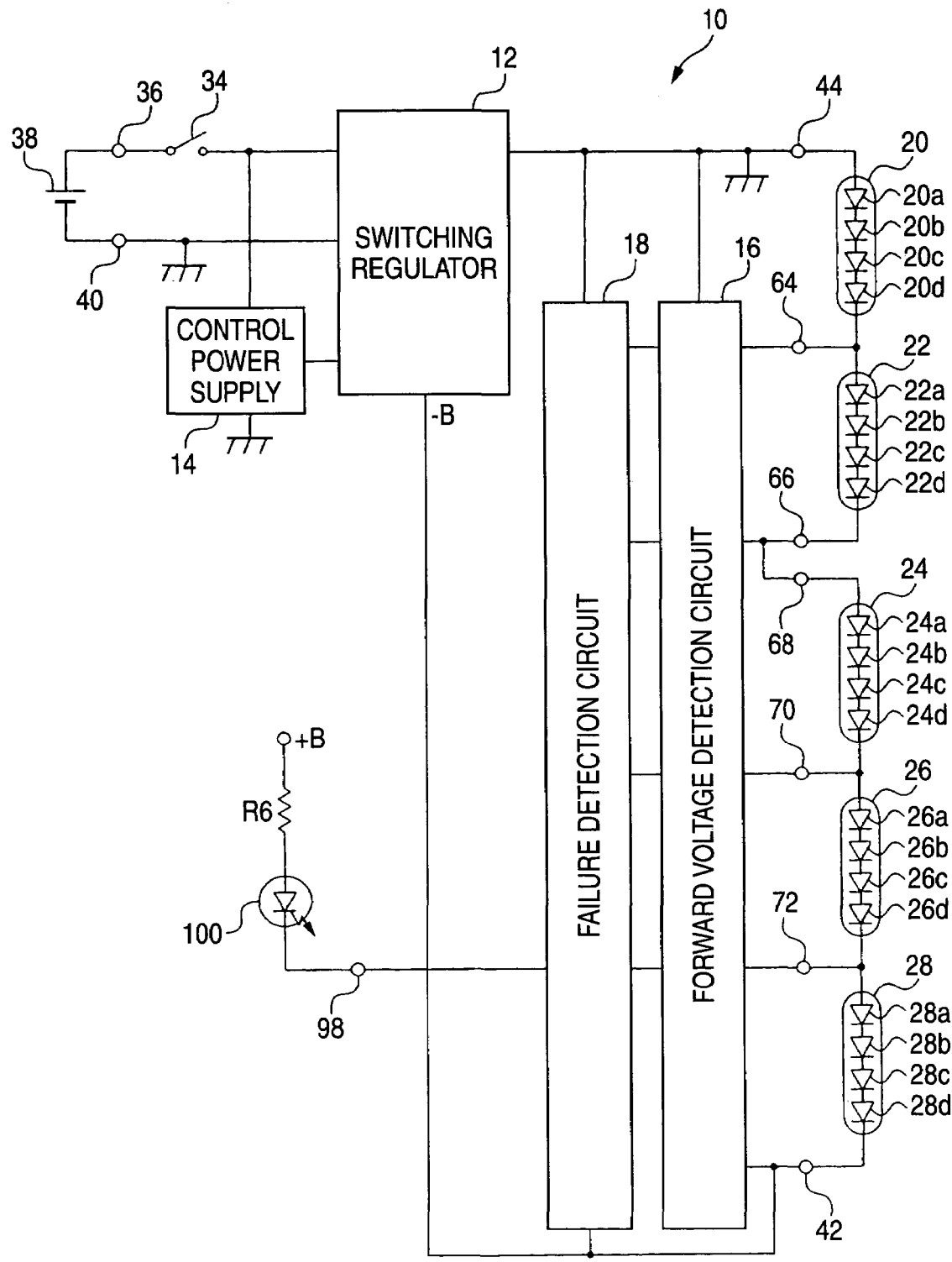
FIG. 1 is a circuit block diagram of a vehicle lighting apparatus according to one embodiment of the present invention.
Figure 2:
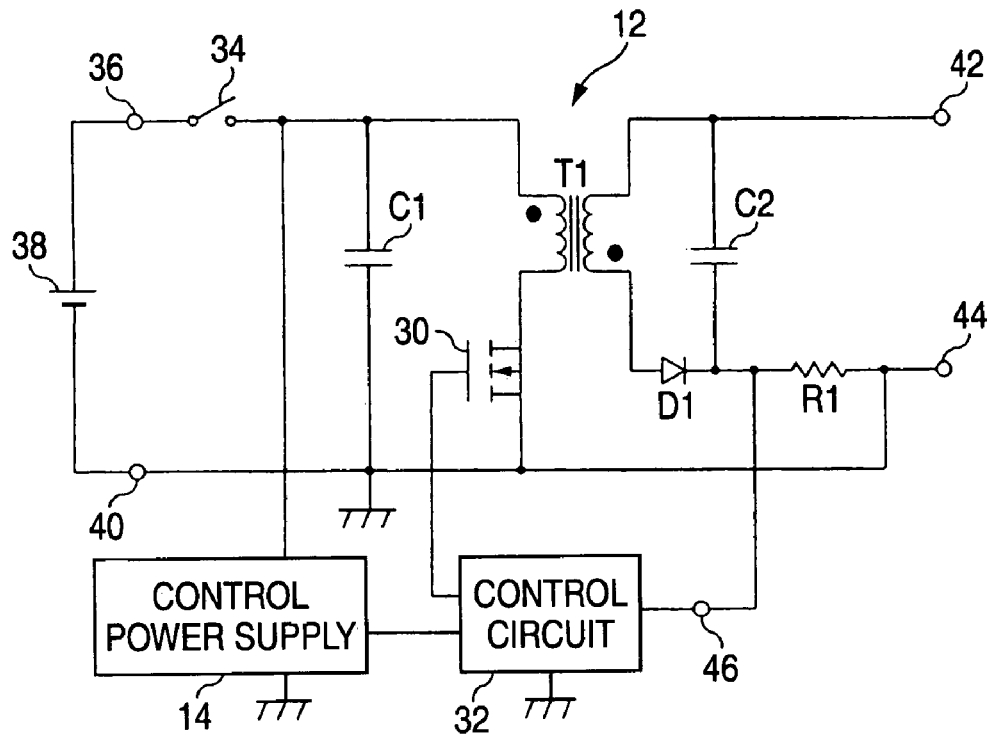
FIG. 2 is a circuit block diagram of a switching regulator.
Figure 3:
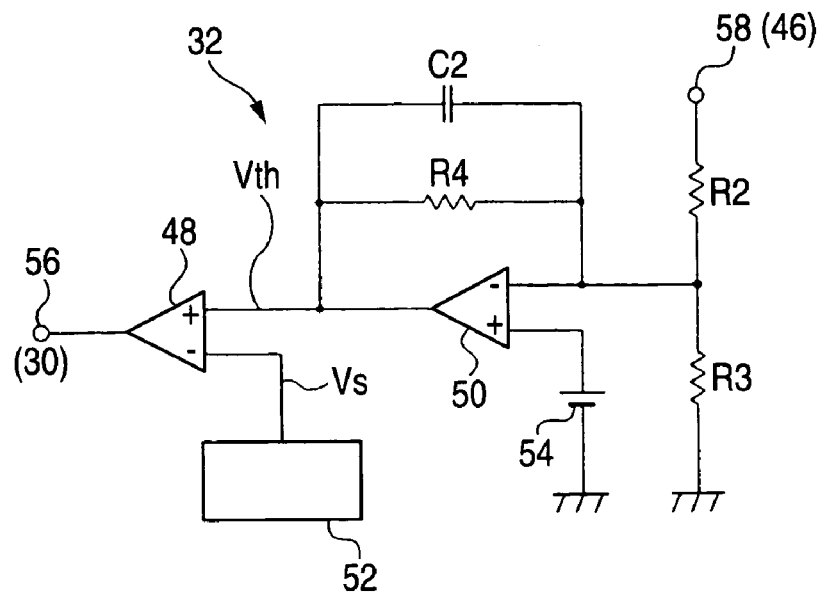
FIG. 3 is a circuit block diagram of a control circuit.
Figure 5:
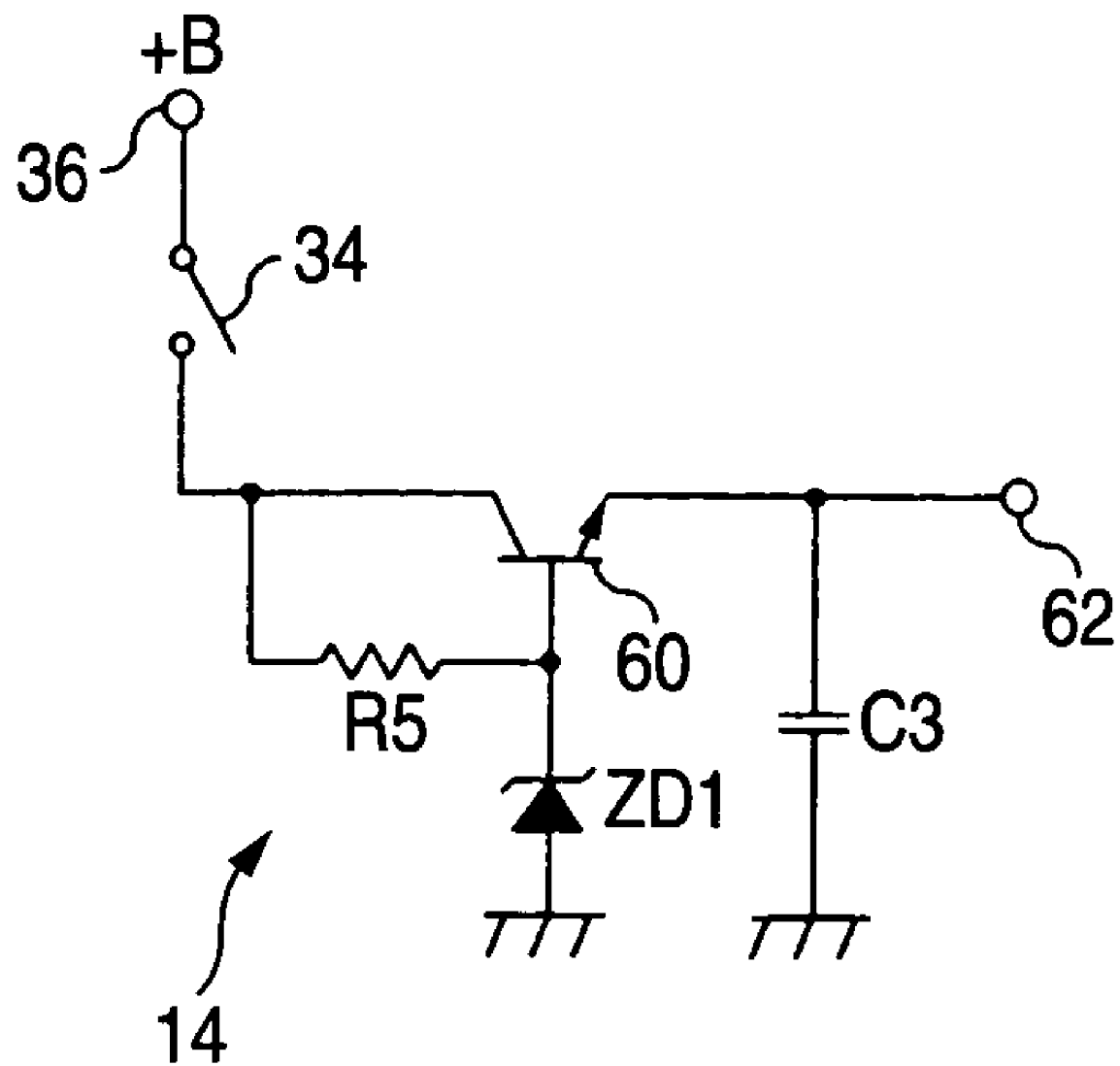
FIG. 5 is a circuit block diagram of a control power supply.
Figure 6:
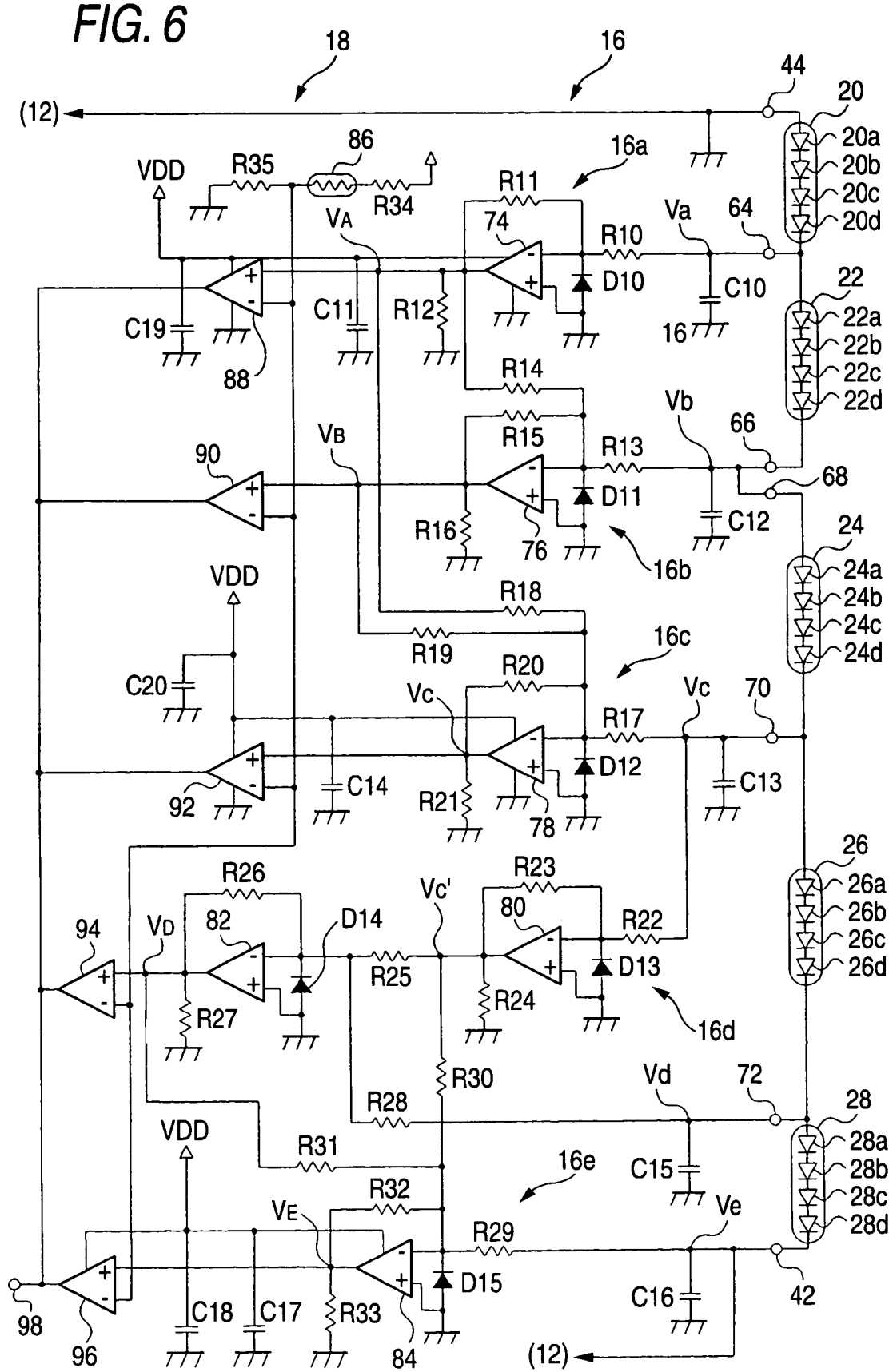
FIG. 6 is a circuit block diagram of the forward voltage detection circuit and the failure detection circuit according to the first embodiment of the invention.
Figure 7:
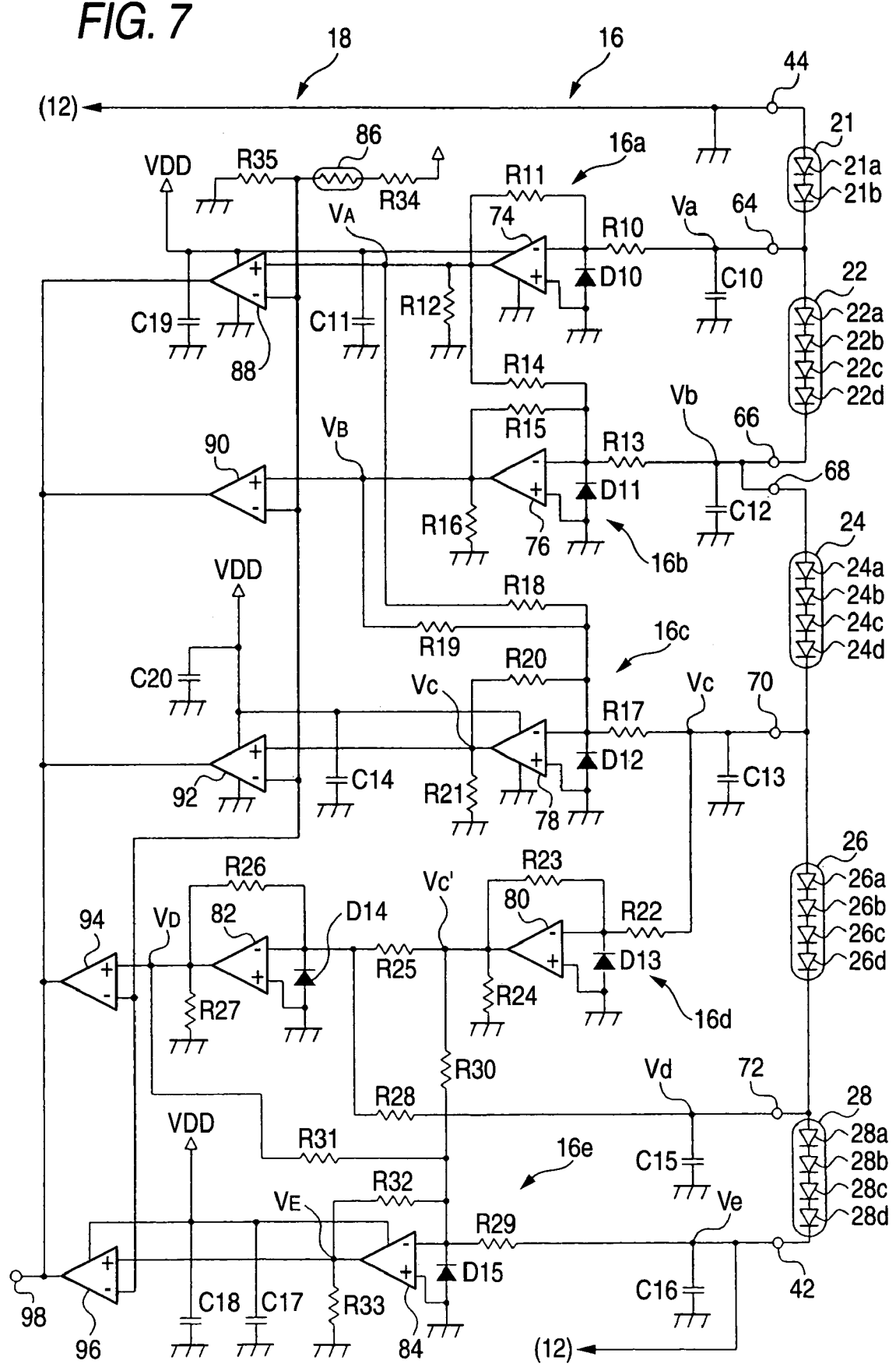
FIG. 7 is a circuit block diagram of the forward voltage detection circuit and the failure detection circuit according to the second embodiment of the invention.
Figure 8:
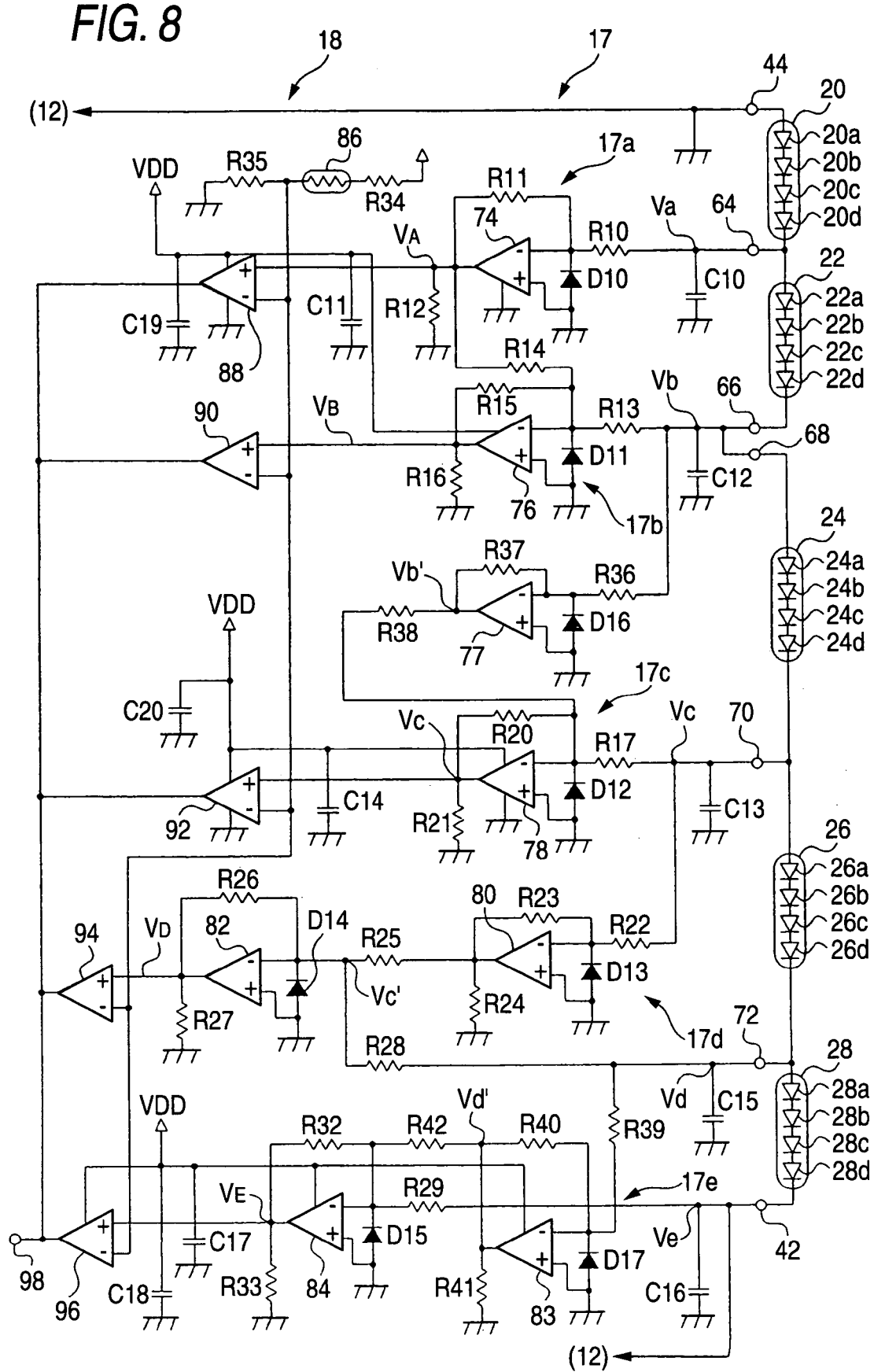
FIG. 8 is a circuit block diagram of the forward voltage detection circuit and the failure detection circuit according to the third embodiment of the invention.
Figure 9:
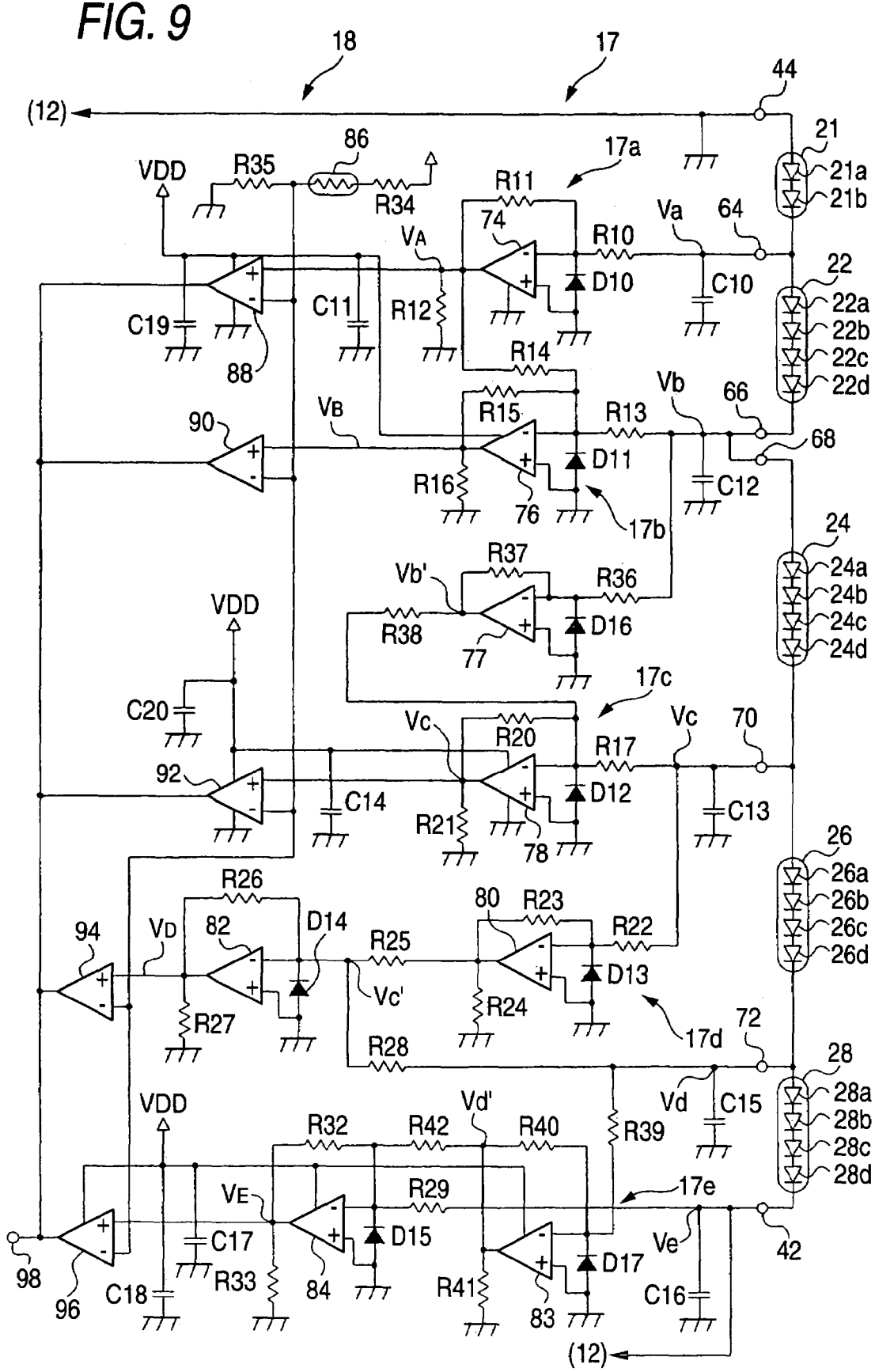
FIG. 9 is a circuit block diagram of the forward voltage detection circuit and the failure detection circuit according to the fourth embodiment of the invention.

Embodiments of the present invention will be described below with reference to the figures. FIG. 1 is a circuit block diagram of a vehicle lighting apparatus according to one embodiment of the invention. FIG. 2 is a circuit block diagram of a switching regulator. FIG. 3 is a control block diagram of a control circuit. FIGS. 4(a) to 4(e) are waveform charts for explaining the operation of the control circuit. FIG. 5 is a circuit block diagram of a control power supply. FIG. 6 is a circuit block diagram showing a forward voltage detection circuit and a failure detection circuit according to a first embodiment of the invention. FIG. 7 is a circuit block diagram showing a forward voltage detection circuit and a failure detection circuit according to a second embodiment of the invention. FIG. 8 is a circuit block diagram showing a forward voltage detection circuit and a failure detection circuit according to a third embodiment of the invention. FIG. 9 is a circuit block diagram showing a forward voltage detection circuit and a failure detection circuit according to a fourth embodiment of the invention.

In these drawings, a vehicle lighting apparatus 10 making up a vehicle lighting fixture comprises a switching regulator 12, a control power supply 14, a forward voltage detection circuit 16, and a failure detection circuit 18, as a lighting control unit, as shown in FIG. 1. The multi-chip LEDs 20, 22, 24, 26 and 28 are connected as the load to the switching regulator 12. The multi-chip LEDs 20 to 28 each contain four LED chips 20a to 20d, 22a to 22d, 24a to 24d, 26a to 26d, and 28a to 28d, which are connected with each other in series, within a package, and are mutually connected in series to the output side of the switching regulator 12, as the semiconductor light sources composed of semiconductor light emitting diodes.

The multi-chip LEDs 20 to 28 consist of light source blocks being connected in parallel, each light source block having a plurality of LEDs mutually connected in series, or a single multi-chip LED. Instead of the single or plural multi-chip LEDs, one or more single chip LEDs may be employed. Also, the multi-chip LEDs 20 to 28 may be made as light sources for various kinds of vehicle lighting fixtures such as a head lamp, a stop and tail lamp, a fog lamp and a turn signal lamp.

The switching regulator 12 comprises a transformer T1, a capacitor C1, an NMOS transistor 30, a control circuit 32, a diode D1, a capacitor C2 and a shunt resistor R1, as shown in FIG. 2. The capacitor C1 is connected in parallel and the NMOS transistor 30 is connected in series to the primary side of the transformer T1. One end of the capacitor C1 is connected via a power switch 34 and a power input terminal 36 to the positive terminal of a vehicle mounted battery (DC power source) 38, and the other end is connected via a power input terminal 40 to the negative terminal of the vehicle mounted battery 38 and grounded. The NMOS transistor 30 has the drain connected to the primary side of the transformer T1, the source grounded and the gate connected to the control circuit 32. The capacitor C2 is connected in parallel via the diode D1 to the secondary side of the transformer T1, the connection point between the diode D1 and the capacitor C2 being connected via the shunt resistor R1 and an output terminal 44 to the anode side of the multi-chip LED 20. One end on the secondary side of the transformer T1 is connected, together with one end of the capacitor C2, via an output terminal 42 to the cathode side of the multi-chip LED 28. The output terminal 42 is the terminal that outputs a negative voltage (−B) with respect to the reference potential (ground potential: 0V). The control circuit 32 is connected via a current detection terminal 46 to the connection point between the diode D1 and the resistor R1. The shunt resistor R1 is current detection means for detecting the current flowing through the multi-chip LEDs 20 to 28, and feeds back the voltage across the shunt resistor R1 as the current of the multi-chip LEDs 20 to 28 to the control circuit 32.

The NMOS transistor 30 is a switching element that is turned on or off in response to the on/off signal (switching signal) outputted from the control circuit 32. When the NMOS transistor 30 is turned on, the input voltage from the vehicle mounted battery 38 is accumulated as electromagnetic energy in the transformer T1. When the NMOS transistor 30 is turned off, the electromagnetic energy accumulated in the transformer T1 is discharged as luminescence energy from the secondary side of the transformer T1 via the diode D1 to the multi-chip LEDs 20 to 28.

That is, the switching regulator 12 is current supply control means for controlling the supply of current to the multi-chip LEDs 20 to 28 by receiving the supply of electric power from the vehicle mounted battery 38. In this case, the switching regulator 12 controls the output current based on the comparison result by comparing the voltage of the current detection terminal 46 with the specified voltage.

Specifically, the control circuit 32 for controlling the switching regulator 12 comprises a comparator 48, an error amplifier 50, a saw-tooth wave generator 52, a reference voltage 54, the resistors R2, R3 and R4, and a capacitor C2, as shown in FIG. 3. An output terminal 56 of the comparator 48 is connected directly or via a preamplifier for current amplification (not shown) to the gate of the NMOS transistor 30, and an input terminal 58 connected to one end of the resistor R2 is connected to the current detection terminal 46. A feedback voltage from the current detection terminal 46 is applied to the input terminal 58, in which the resistors R2 and R3 divide the voltage applied to the input terminal 58, a partial voltage obtained by dividing the voltage being applied to a negative input terminal of the error amplifier 50. The error amplifier 50 outputs the voltage according to a difference between the voltage applied to the negative input terminal and the reference voltage 54 as a threshold Vth to a positive input terminal of the comparator 48. The comparator 48 takes a saw-tooth wave Vs from the saw-tooth wave generator 52 into the negative input terminal, compares this saw-tooth wave Vs with the threshold Vth, and outputs an on/off signal according to this comparison result to the gate of the NMOS transistor 30.

For example, when the level of the threshold Vth is almost intermediate in the saw-tooth wave Vs, the on/off signal with an on-duty of about 50% is outputted, as shown in FIGS. 4(a) and 4(b). On the other hand, when the level of the voltage fed back from the current detection terminal 46 is lower than the reference voltage 54 as the output current of the switching regulator 12 decreases, the level of the threshold Vth with the output of the error amplifier 50 increases, so that an on/off signal with an on-duty of above 50% is outputted from the comparator 48, as shown in FIGS. 4(c) and 4(d). As a result, the output current of the switching regulator 12 increases.

Conversely, when the level of the voltage fed back from the current detection terminal 46 is higher than the reference voltage 54 and the level of the threshold Vth with the output of the error amplifier 50 decreases as the output current of the switching regulator 12 increases, an on/off signal with an on-duty of below 50% is outputted from the comparator 48, as shown in FIGS. 4(e) and 4(f). As a result, the output current of the switching regulator 12 decreases. Instead of the saw-tooth wave generator 52, a chopping wave generator for generating the chopping wave (chopping wave signal) may be employed.

An electric power is supplied from the control power supply 14 to the control circuit 32. The control power supply 14 comprises an NPN transistor 60, a resistor R5, a Zener diode ZD1 and a capacitor C3, as a series regulator, as shown in FIG. 5. The collector of the NPN transistor 60 is connected via a power supply switch 34 to the power supply input terminal 36, and the emitter is connected via an output terminal 62 to the control circuit 32. The NPN transistor 60 outputs a voltage according to the Zener voltage occurring across the Zener diode ZD1 from the emitter via the output terminal 62 to the control circuit 32, when a power supply voltage is applied from the power input terminal 36.

On the other hand, the forward voltage detection circuit 16 comprises the forward voltage detection circuits 16a, 16b, 16c, 16d and 16e, as shown in FIG. 6. The forward voltage detection circuits 16a to 16e are a forward voltage detection means group for detecting the forward voltage Vf (total forward voltage of four LED chips) across each of the multi-chip LEDs 20 to 28, and outputting the detected result to the failure detection circuit 18, with the forward voltage detection circuits being connected to one end of the multi-chip LEDs 20 to 28 via the voltage detection terminals 64, 66, 68, 70, 72 and the output terminal 42 on the input side.

The forward voltage detection circuit 16a comprises an inverted amplifier 74, the capacitors C10 and C11, the resistors R10, R11 and R12, and a diode D10, with the negative input terminal of the inverted amplifier 74 being connected via the resistor R10 to the detection terminal 64, and is reference potential side inverted amplification means for inversely amplifying the terminal voltage Va of the multi-chip LED 20 arranged at the position closest to the reference potential. Assuming that the forward voltages of the multi-chip LEDs 20 to 28 are Vf (total forward voltage of four LED chips), the terminal voltage Va is equal to −Vf on the basis of the reference potential (GND)=0V. For the sake of simpler explanation here, the output voltage $V_A$ of the inverted amplifier 74 is +Vf, where the amplification degree of the inverted amplifier 74 is "1".

The forward voltage detection circuit 16b comprises an inverted amplifier 76, a capacitor C12, the resistors R13, R14, R15 and R16, and a diode D11. The negative input terminal of the inverted amplifier 76 is connected via a resistor R13 to the detection terminals 66 and 68, and via a resistor R14 to the output side of the inverted amplifier 74. This forward voltage detection circuit 16b is inverted amplification means for difference amplification for inputting the output voltage $V_A$ of the inverted amplifier 74 as the voltage to be operated via the resistor R14 and inputting the terminal voltage Vb of the multi-chip LED 22 and inversely amplifying a difference between both voltages. Assuming that the forward voltages of the multi-chip LEDs 20 to 28 are Vf, the terminal voltage Vb is −2Vf on the basis of the reference potential=0V. The output voltage $V_B$ of the inverted amplifier 76 is −(−2Vf+Vf)=Vf, where the amplification degrees of the inverted amplifiers 74 and 76 are "1".

The forward voltage detection circuit 16c comprises an inverted amplifier 78, the capacitors C13 and C14, the resistors R17, R18, R19, R20 and R21, and a diode D12. The negative input terminal of the inverted amplifier 78 is connected via a resistor R17 to the detection terminal 70 and via a resistor R18 to the output side of the inverted amplifier 74, and connected via a resistor R19 to the output side of the inverted amplifier 76. This forward voltage detection circuit 16c is inverted amplification means for difference amplification for inputting the output voltage $V_A$ of the inverted amplifier 74 and the output voltage $V_B$ of the inverted amplifier 76 as the voltage to be operated via the resistors R18 and R19 and inputting the terminal voltage Vc of the multi-chip LED 24 and inversely amplifying a difference between the input voltages. In this case, the inverted amplifier 78 inputs, as the terminal voltage to be inversely amplified, the output voltages $V_A$ and $V_B$ of the other inverted amplifiers 74 and 76 into which the terminal voltages Va and Vb having a smaller difference from the reference potential=0V than the terminal voltage Vc to be inversely amplified by itself are inputted as the voltage to be operated.

Assuming that the forward voltages of the multi-chip LEDs 20 to 28 are Vf, the terminal voltage Vc is −3Vf on the basis of the reference potential=0V. The output voltage $V_C$ of the inverted amplifier 78 is −(−3Vf+Vf+Vf)=Vf, where the amplification degrees of the inverted amplifiers 74, 76 and 78 are "1".

The forward voltage detection circuit 16d comprises inverted amplifiers 80 and 82, a capacitor C15, the resistors R22, R23, R24, R25, R26, R27 and R28, and the diodes D13 and D14. The negative input terminal of the inverted amplifier 80 is connected via a resistor R22 to the detection terminal 70, and the negative input terminal of the inverted amplifier 82 is connected via a resistor R28 to the detection terminal 72. The inverted amplifier 80 is inverted amplification means for inversely amplifying the terminal voltage Vc of the multi-chip LED 24. The inverted amplifier 82 is inverted amplification means for difference amplification for inversely amplifying a difference between the output voltage Vc' of the inverted amplifier 80 and the terminal voltage Vd of the multi-chip LED 26.

Assuming that the forward voltages of the multi-chip LEDs 20 to 28 are Vf, the terminal voltage Vc is −3Vf on the basis of the reference potential=0V and the terminal voltage Vd is −4Vf on the basis of the reference potential=0V. The output voltage Vc' of the inverted amplifier 80 is +3Vf and the output voltage $V_D$ of the inverted amplifier 82 is −(−4Vf+3Vf)=+Vf, where the amplification degrees of the inverted amplifiers 80 and 82 are "1".

The forward voltage detection circuit 16e comprises an inverted amplifier 84, the condensers C16, C17 and C18, the resistors R29, R30, R31, R32 and R33, and a diode D15. The negative input terminal of the inverted amplifier 84 is connected via a resistor R29 to the output terminal 42, and via a resistor R30 to the output side of the inverted amplifier 80, and via a resistor R31 to the output side of the inverted amplifier 82. This forward voltage detection circuit 16d is inverted amplification means for difference amplification for inputting the output voltage Vc'=+3Vf of the inverted amplifier 80 and the output voltage $V_D$=+Vf of the inverted amplifier 82 as the voltage to be operated via the resistors R30 and R31 and inputting the terminal voltage Ve of the multi-chip LED 28 and inversely amplifying a difference between the input voltages. Assuming that the forward voltages of the multi-chip LEDs 20 to 28 are Vf, the terminal voltage Vc is −3Vf on the basis of the reference potential=0V and the terminal voltage Ve is −5Vf on the basis of the reference potential=0V. Assuming that the amplification degrees of the inverted amplifiers 80, 82 and 84 are "1", it becomes −(−5Vf+3Vf+Vf)=+Vf, and therefore the output voltage $V_E$ becomes +Vf.

In this way, the forward voltage detection circuits 16a, 16b, 16c, 16d and 16e detect the forward voltage Vf (total forward voltage of four LED chips) of the multi-chip LEDs 20 to 28, and output each detected result as the output voltage $V_A$ to $V_E$=+Vf to the failure detection circuit 18.

Herein, if the multi-chip LED having smaller forward voltage Vf among the multi-chip LEDs 20 to 28 is arranged at the position closer to the reference potential=0V, the forward voltage Vf of the multi-chip LED 20 is the smallest, and the forward voltage Vf of the multi-chip LED 28 is the largest. In this case, the forward voltage detection circuit 16a can detect the forward voltage Vf of the multi-chip LED 20 at high precision even though the forward voltage Vf of the multi-chip LED 20 is the smallest, because the inverted amplifier 74 inversely amplifies the terminal voltage Va having the smallest difference from the reference potential (GND)=0V among the terminal voltages Va to Ve. Conversely, the forward voltage detection circuit 16*e* can detect the forward voltage Vf of the multi-chip LED 28 at high precision in which the forward voltage Vf of the multi-chip LED 28 is the largest, because the inverted amplifier 84 inversely amplifies the terminal voltage Ve having the largest difference from the reference potential (GND)=0V among the terminal voltages Va to Ve.

The failure detection circuit 18 comprises a thermistor 86, the comparators 88, 90, 92, 94 and 96, the resistors R34 and R35, and the capacitors C19 and C20. The comparators 88 to 96 have the positive input terminal connected to the output side of the inverted amplifiers 74, 76, 78, 82 and 84, and the negative input terminal connected to a connection point (Vref) between the resistor R35 and the thermistor 86, with their output terminals being OR connected with each other to an external connection terminal 98. The external connection terminal 98 is connected via an LED 100 and the resistor R6 to the positive terminal of the vehicle mounted battery 38.

The comparators 88, 90, 92, 94 and 96 compare the output voltage $V_A$ to $V_E$=+Vf of the inverted amplifiers 74, 76, 78, 82 and 84 with the reference voltage Vref, in which a "low level" failure detection signal is outputted to the external connection terminal 98, only if any of the output voltages $V_A$ to $V_E$ is below the reference voltage Vref. If the external connection terminal 98 becomes "low level", the LED 100 is lighted to inform the driver that there is a failure in any of the multi-chip LEDs 20 to 28 due to a drop in the forward voltage Vf.

In this embodiment, because among the multi-chip LEDs 20 to 28, the multi-chip LED having smaller forward voltage Vf is arranged at the position closer to the reference potential=0V, the forward voltage Vf of the multi-chip LEDs 20 to 28 can be detected at high precision, even if the multi-chip LEDs 20 to 28 have different magnitudes of the forward voltage Vf. Thereby, it can be accurately reported that there is a failure in any of the multi-chip LEDs 20 to 28 due to a drop in the forward voltage Vf.

Also, in this embodiment, in the forward voltage detection circuit 16*b*, the output voltage $V_A$ of the inverted amplifier 74 is applied (fed back) to the input side of the inverted amplifier 76 to obtain a difference between the output voltage $V_A$ and the terminal voltage Vb, and the inverted amplifier 76 inversely amplifies the difference to acquire the floating forward voltage Vf. Further, in the forward voltage detection circuit 16*c*, the output voltages $V_A$ and $V_B$ of the inverted amplifiers 74, 76 are applied (fed back) to the input side of the inverted amplifier 78 to obtain a difference between the output voltages $V_A$, $V_B$ and the terminal voltage Vc, and the inverted amplifier 78 inversely amplifies the difference to acquire the floating forward voltage Vf. The operation of calculating the difference is repeated in due order. Therefore, even if the terminal voltages Vb, Vc are larger than the reference potential, the floating forward voltage Vf can be obtained without increasing the number of inverted amplifiers, whereby the circuit configuration can be simplified.

On the other hand, if the operation of calculating the difference in due order as the terminal voltage increases with respect to the reference potential is directly employed, the errors due to variation factors of the circuit are multiplied to make the detection precision worse. In view of the detection precision, in the forward voltage detection circuit 16*d*, the terminal voltage Vc is inversely amplified by the inverted amplifier 80, a difference between the output voltage of the inverted amplifier 80 and the terminal voltage Vd is obtained, and this difference is inversely amplified by the inverted amplifier 82.

Referring to FIG. 7, a second embodiment of the invention will be described below. In the second embodiment, instead of the multi-chip LED 20, a multi-chip LED 21 in which two LED chips 21*a* and 21*b* connected with each other in series is contained within a package is employed, in which the multi-chip LED 21 having the smallest number of chips is arranged at the position closest to the reference potential=0V, and the amplification degree of the inverted amplifier 74 is changed from one to two. The other configuration is the same as in the first embodiment.

Herein, if the forward voltage of the multi-chip LED 21 is ½Vf (total forward voltage of two LED chips), the terminal voltage Va is −½Vf on the basis of the reference potential (GND)=0V. If the amplification degree of the inverted amplifier 74 is "2", the output voltage $V_A$ of the inverted amplifier 74 is +Vf. In this case, the terminal voltages Vb to Ve are −1.5Vf, −2.5Vf, −3.5Vf and −4.5Vf, unlike the first embodiment, but by inversely amplifying each terminal voltage in each forward voltage detection circuit 16*b*, 16*c*, 16*d* and 16*e*, the output voltage $V_B$ to $V_E$=+Vf corresponding to the forward voltage Vf (total forward voltage of four LED chips) of each multi-chip LED 22 to 28 can be outputted from each forward voltage detection circuit 16*b*, 16*c*, 16*d* and 16*e* to the failure detection circuit 18.

In this embodiment, the forward voltage detection circuit 16*a* can detect the forward voltage Vf of the multi-chip LED 21 at high precision even though the forward voltage of the multi-chip LED 21 is the smallest among the multi-chip LEDs 21 to 28, or ½Vf, because the inverted amplifier 74 inversely amplifies the terminal voltage Va=−0.5Vf having the smallest difference from the reference potential (GND)= 0V among the terminal voltages Va to Ve.

Also, in this embodiment, when a multi-chip LED in which three LED chips connected with each other in series is contained within a package is employed, in addition to the multi-chip LED 21, this multi-chip LED may be arranged adjacent to the multi-chip LED 21.

In this embodiment, since the multi-chip LED 21 having the smallest number of chips among the multi-chip LEDs 21 to 28 is arranged at the position closest to the reference potential=0V, the forward voltage Vf of each of the multi-chip LEDs 21 to 28 can be detected at high precision even though the multi-chip LEDs 21 to 28 have different magnitudes of forward voltage Vf, whereby it can be securely reported that the failure occurs in any of the multi-chip LEDs 21 to 28 due to a drop in the forward voltage Vf.

Referring to FIG. 8, a third embodiment of the invention will be described below. In this embodiment, a forward voltage detection circuit 17 is employed instead of the forward voltage detection circuit 16. The third embodiment is partly different from the first embodiment in the configuration of the forward voltage detection circuit 17.

The forward voltage detection circuit 17 comprises the forward voltage detection circuits 17*a*, 17*b*, 17*c*, 17*d* and 17*e*. The forward voltage detection circuits 17*a* to 17*e* are forward voltage detection means for detecting the forward voltage Vf (total forward voltage of four LED chips) across the multi-chip LEDs 20 to 28, and outputting the detected result to the failure detection circuit 18, with the forward voltage detection circuits being connected to one end of the multi-chip LEDs 20 to 28 via the voltage detection terminals 64, 66, 68, 70, 72 and the output terminal 42 on the input side.

The forward voltage detection circuit 17*a*, like the forward voltage detection circuit 16*a*, comprises an inverted amplifier 74, the capacitors C10 and C11, the resistors R10, R11 and R12, and a diode D10, with the negative input terminal of the inverted amplifier 74 being connected via the resistor R10 to the detection terminal 64, and is reference potential side inverted amplification means for inversely amplifying the terminal voltage Va of the multi-chip LED 20 arranged at the position closest to the reference potential. Assuming that the forward voltages of the multi-chip LEDs 20 to 28 are Vf (total forward voltage of four LED chips), the terminal voltage Va is equal to −Vf on the basis of the reference potential (GND)= 0V. The output voltage $V_A$ of the inverted amplifier 74 is +Vf, where the amplification degree of the inverted amplifier 74 is "1".

The forward voltage detection circuit 17b, like the forward voltage detection circuit 16b, comprises an inverted amplifier 76, the capacitor C12, the resistors R13, R14, R15 and R16, and a diode D11. The negative input terminal of the inverted amplifier 76 is connected via a resistor R13 to the detection terminals 66 and 68, and via a resistor R14 to the output side of the inverted amplifier 74. This forward voltage detection circuit 17b is inverted amplification means for difference amplification for inputting the output voltage $V_A$ of the inverted amplifier 74 as the voltage to be operated via the resistor R14 and inputting the terminal voltage Vb of the multi-chip LED 22 and inversely amplifying a difference between both voltages. Assuming that the forward voltages of the multi-chip LEDs 22 to 28 are Vf, the terminal voltage Vb is −2Vf on the basis of the reference potential=0V. The output voltage $V_B$ of the inverted amplifier 76 is −(−2Vf+Vf)=Vf, where the amplification degrees of the inverted amplifiers 74 and 76 are "1".

The forward voltage detection circuit 17c comprises the inverted amplifiers 77 and 78, the capacitors C13 and C14, the resistors R17, R20, R21, R36, R37 and R38, and the diodes D12 and D16. The negative input terminal of the inverted amplifier 77 is connected via a resistor R36 to the detection terminals 66 and 68, and the negative input terminal of the inverted amplifier 78 is connected via a resistor R17 to the detection terminal 70. The inverted amplifier 77 inversely amplifies the terminal voltage Vb of the multi-chip LED 22, and applies the inversely amplified voltage via a resistor R38 to the input side of the inverted amplifier 78. The inverted amplifier 78 is inverted amplification means for difference amplification for inputting the output voltage of the inverted amplifier 77 as the voltage to be operated via the resistor R38 and inputting the terminal voltage Vc of the multi-chip LED 24 and inversely amplifying a difference between the input voltages.

Assuming that the forward voltages of the multi-chip LEDs 22 and 24 are Vf, the terminal voltage Vb is −2Vf on the basis of the reference potential=0V and the terminal voltage Vc is −3Vf on the basis of the reference potential=0V. The output voltage Vb' of the inverted amplifier 77 is +2Vf and the output voltage $V_C$ of the inverted amplifier 78 is −(−3Vf+2Vf)=Vf, where the amplification degrees of the inverted amplifiers 77 and 78 are "1".

The forward voltage detection circuit 17d, like the forward voltage detection circuit 16d, comprises the inverted amplifiers 80 and 82, a capacitor C15, the resistors R22, R23, R24, R25, R26, R27 and R28, and the diodes D13 and D14. The negative input terminal of the inverted amplifier 80 is connected via a resistor R22 to the detection terminal 70, and the negative input terminal of the inverted amplifier 82 is connected via a resistor R28 to the detection terminal 72. The inverted amplifier 80 is inverted amplification means for inversely amplifying the terminal voltage Vc of the multi-chip LED 24. The inverted amplifier 82 is inverted amplification means for difference amplification for inversely amplifying a difference between the output voltage Vc' of the inverted amplifier 80 and the terminal voltage Vd of the multi-chip LED 26.

Assuming that the forward voltages of the multi-chip LEDs 22 to 28 are Vf, the terminal voltage Vc is −3Vf on the basis of the reference potential=0V and the terminal voltage Vd is −4Vf on the basis of the reference potential=0V. The output voltage Vc' of the inverted amplifier 80 is +3Vf, where the amplification degrees of the inverted amplifiers 80 and 82 are "1". The output voltage $V_D$ of the inverted amplifier 82 is −(−4Vf+3Vf)=+Vf The forward voltage detection circuit 17e comprises the inverted amplifiers 83 and 84, the capacitors C16, C17 and C18, the resistors R29, R32, R33, R39, R40, R41 and R42, and the diodes D15 and D17. The negative input terminal of the inverted amplifier 83 is connected via a resistor R39 to the detection terminal 72, and the negative input terminal of the inverted amplifier 84 is connected via a resistor R29 to the output terminal 42. The inverted amplifier 83 inversely amplifies the terminal voltage Vd of the multi-chip LED 26, and applies the inversely amplified voltage Vd' via a resistor R42 to the input side of the inverted amplifier 84. The inverted amplifier 84 is inverted amplification means for difference amplification for inputting the output voltage Vd' of the inverted amplifier 83 as the voltage to be operated via the resistor R42 and inputting the terminal voltage Ve of the multi-chip LED 28 and inversely amplifying a difference between the input voltages. Assuming that the forward voltages of the multi-chip LEDs 20 to 28 are Vf, the terminal voltage Vd is −4Vf on the basis of the reference potential=0V and the terminal voltage Ve is −5Vf on the basis of the reference potential=0V. The output voltage Vd' of the inverted amplifier 83 is +4Vf, where the amplification degrees of the inverted amplifiers 83 and 84 are "1". And the output voltage $V_E$ is −(−5Vf+4Vf)=+Vf.

In this way, the forward voltage detection circuits 17a, 17b, 17c, 17d and 17e detect the forward voltage Vf (total forward voltage of four LED chips) of the multi-chip LEDs 20 to 28, and output the detected result as the output voltage $V_A$ to $V_E$=+Vf to the failure detection circuit 18.

Herein, if the multi-chip LED having smaller forward voltage Vf among the multi-chip LEDs 20 to 28 is arranged at the position closer to the reference potential=0V, the forward voltage Vf of the multi-chip LED 20 is the smallest, and the forward voltage Vf of the multi-chip LED 28 is the largest. In this case, the forward voltage detection circuit 17a can detect the forward voltage Vf of the multi-chip LED 20 at high precision even though the forward voltage Vf of the multi-chip LED 20 is the smallest, because the inverted amplifier 74 inversely amplifies the terminal voltage Va having the smallest difference from the reference potential (GND)=0V among the terminal voltages Va to Ve. Conversely, the forward voltage detection circuit 17e can detect the forward voltage Vf of the multi-chip LED 28 at high precision in which the forward voltage Vf of the multi-chip LED 28 is the largest, because the inverted amplifiers 83 and 84 inversely amplify the terminal voltage Ve having the largest difference from the reference potential (GND)=0V among the terminal voltages Va to Ve.

In this embodiment, since the multi-chip LED having smaller forward voltage Vf among the multi-chip LEDs 20 to 28 is arranged at the position closer to the reference potential=0V, the forward voltage Vf of the multi-chip LEDs 20 to 28 can be detected at high precision, even if the multi-chip LEDs 20 to 28 have different magnitudes of the forward voltage Vf. Thereby, it can be accurately reported that there is a failure in any of the multi-chip LEDs 20 to 28 due to a drop in the forward voltage Vf.

Also, in this embodiment, the terminal voltage is inversely amplified using the inverted amplifiers 77, 78, 80, 82, 83 and 84, two for each circuit, in the forward voltage detection circuits 17c and 17e, in addition to the forward voltage detection circuit 17d, whereby the forward voltage Vf can be detected at high precision.

Referring to FIG. 9, a fourth embodiment of the invention will be described below. In the fourth embodiment, instead of the forward voltage detection circuit 16, the forward voltage detection circuit 17 is employed. The fourth embodiment is partly different from the second embodiment in the configuration of the forward voltage detection circuit 17. That is, instead of the multi-chip LED 20, a multi-chip LED 21 in which two LED chips connected with each other in series is contained within a package is employed, in which the multi-chip LED 21 having the smallest number of chips is arranged at the position closest to the reference potential=0V, and the amplification degree of the inverted amplifier 74 is changed from one to two.

Herein, if the forward voltage of the multi-chip LED 21 is ½Vf (total forward voltage of two LED chips), the terminal voltage Va is −½Vf on the basis of the reference potential (GND)=0V. Assuming that the amplification degree of the inverted amplifier 74 is "2" and the amplification degrees of the other inverted amplifiers are "1", the output voltage $V_A$ of the inverted amplifier 74 is +Vf. In this case, the terminal voltages Vb to Ve are −1.5Vf, −2.5Vf, −3.5Vf and −4.5Vf, unlike the first embodiment, but by inversely amplifying each terminal voltage in each forward voltage detection circuit 17b, 17c, 17d and 17e, the output voltage $V_B$ to $V_E$=+Vf corresponding to the forward voltage Vf (total forward voltage of four LED chips) of each multi-chip LED 22 to 28 can be outputted from each forward voltage detection circuit 17b, 17c, 17d and 17e to the failure detection circuit 18.

In this embodiment, the forward voltage detection circuit 17a can detect the forward voltage Vf of the multi-chip LED 21 at high precision even though the forward voltage of the multi-chip LED 21 is the smallest among the multi-chip LEDs 21 to 28, or ½Vf, because the inverted amplifier 74 inversely amplifies the terminal voltage Va=−0.5Vf having the smallest difference from the reference potential (GND)=0V among the terminals Va to Ve.

Also, in this embodiment, when a multi-chip LED in which three LED chips connected with each other in series is contained within a package is employed, in addition to the multi-chip LED 21, this multi-chip LED may be arranged adjacent to the multi-chip LED 21.

In this embodiment, since the multi-chip LED 21 having the smallest number of chips among the multi-chip LEDs 21 to 28 is arranged at the position closest to the reference potential =0V, the forward voltages Vf of the multi-chip LEDs 21 to 28 can be detected at high precision even though the multi-chip LEDs 21 to 28 have different magnitudes of forward voltage Vf, whereby it can be accurately reported that the failure occurs in any of the multi-chip LEDs 21 to 28 due to a drop in the forward voltage Vf.

While in the above embodiments, the failure detection circuit 18 may use a microcomputer (micon) for converting the output voltage of each forward voltage detection circuit 16a to 16e into a digital signal, comparing the digital signal with the reference value and determining the presence or absence of failure based on this comparison result, instead of the comparators 88 to 96.

While in the above embodiments, the switching regulator 12 outputs the negative (negative with respect to the reference potential=ground 0V) voltage, the invention may be also applied to the switching regulator 12 that outputs the positive (positive with respect to the reference potential=ground 0V) voltage.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS AND SIGNS

10 vehicle lighting apparatus
12 switching regulator
14 control power supply
16, 16a to 16e forward voltage detection circuit
17, 17a to 17e forward voltage detection circuit
18 failure detection circuit
20, 21, 22, 24, 26, 28 multi-chip LED

What is claimed is:

1. A vehicle lighting apparatus comprising:
   a plurality of semiconductor light sources that are connected with each other in series;
   a switching regulator for supplying an electric power from a power source to each of said plurality of semiconductor light sources;
   forward voltage detection means for detecting a forward voltage of each of said plurality of semiconductor light sources; and
   failure detection means for detecting the failure of each of said semiconductor light sources based on the detected value of said forward voltage detection means;
   wherein a semiconductor light source having a lower forward voltage is connected closer to a reference potential side of said power source among said plurality of semiconductor light sources.

2. The vehicle lighting apparatus according to claim 1, wherein said forward voltage detection means comprises:
   a plurality of inverted amplification means for inversely amplifying the terminal voltage of each of said semiconductor light sources on the basis of the reference potential of said power source, and outputting the voltage corresponding to the forward voltage of each of said semiconductor light sources, said plurality of inverted amplification means comprising:
   reference potential side inverted amplification means for inversely amplifying the terminal voltage of the reference potential side semiconductor light source arranged at a position closest to said reference potential, and
   one or more inverted amplification means for difference amplification for inputting the output voltage of said reference potential side inverted amplification means at least as the voltage to be operated, and inversely amplifying a difference between said voltage to be operated and the terminal voltage of the semiconductor light source different from said reference potential side semiconductor light source,
   wherein said one or more inverted amplification means for difference amplification input, as the terminal voltage to be inversely amplified, the output voltage of the other inverted amplification means for difference amplification into which terminal voltage having a smaller difference from said reference potential than the terminal voltage to be inversely amplified by itself is inputted as said voltage to be operated.

3. The vehicle lighting apparatus according to claim 1, wherein the semiconductor light source having a smaller number of chips is connected closer to the reference potential side of said power source among said plurality of semiconductor light sources.

4. The vehicle lighting apparatus according to claim 2, wherein the semiconductor light source having a smaller number of chips is connected closer to the reference potential side of said power source among said plurality of semiconductor light sources.

5. The vehicle lighting apparatus according to claim 1, wherein each of the plurality of semiconductor light sources comprises a plurality of LED chips that are connected in series.

6. The vehicle lighting apparatus according to claim 1, wherein the forward voltage detection means comprises at least one voltage detection terminal provided between an output end of one of the semiconductor light sources and an input end of another of the plurality of semiconductor light sources directly connected in series to said one of the semiconductor light sources.

* * * * *